United States Patent Office 3,135,127
Patented June 2, 1964

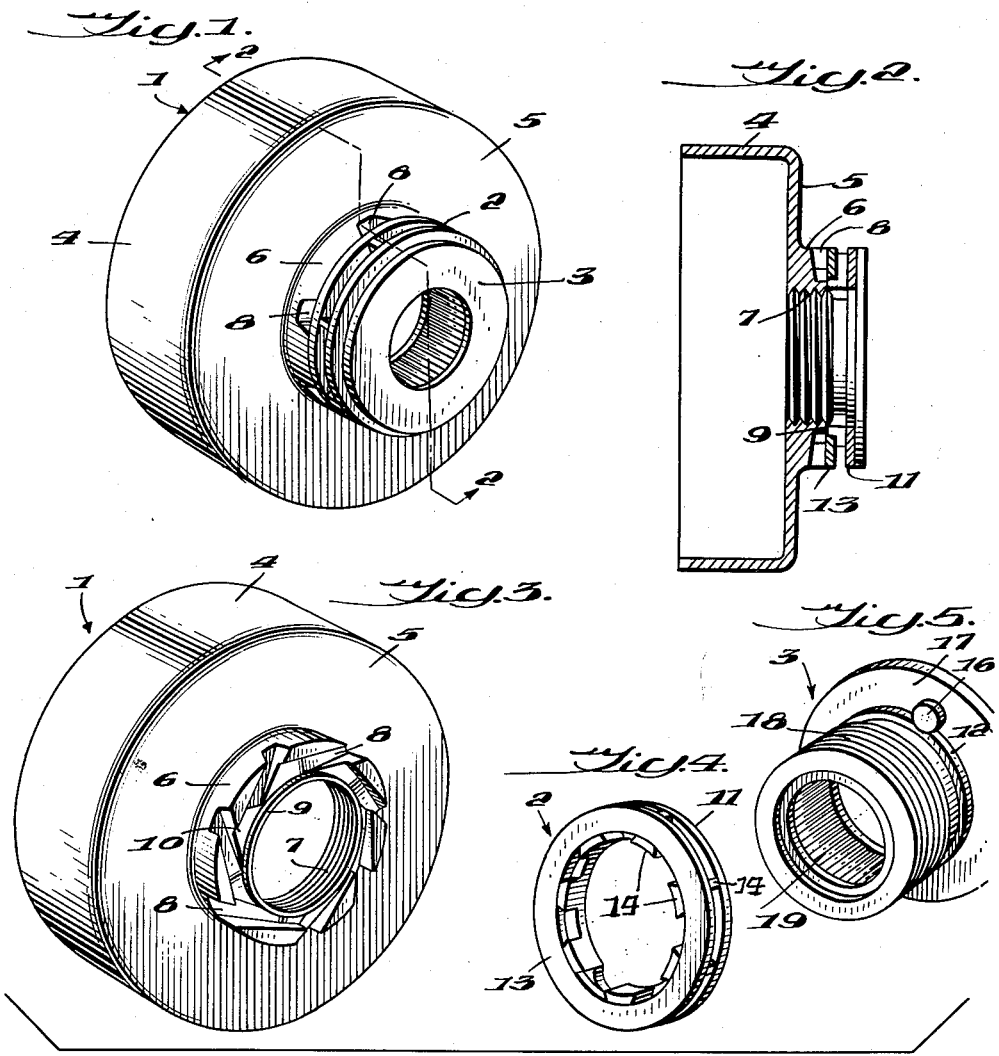

3,135,127
SPROCKET FOR SAW CHAIN
Troy J. Reed, P.O. Box 104, Pawnee, Okla.
Filed Aug. 6, 1962, Ser. No. 215,191
5 Claims. (Cl. 74—243)

This invention relates to a sprocket for chain saws and more particularly to the combination of a saw chain sprocket with a friction clutch drum for driving the sprocket including means for the discharge of sawdust from the sprocket.

The invention is limited to that type of saw chain sprocket which consists essentially of two plane, spaced apart circular discs with teeth secured between the discs, the sprocket being secured to the clutch drum and both the sprocket and the clutch drum being adapted to be mounted upon a shaft to rotate therewith or thereupon. In a structure such as this if the valleys between the teeth are closed at the bottoms thereof sawdust tends to accumulate and to be compacted therein and may give rise to difficulties in the operation of the saw such as causing the chain to jump off of the sprocket or to ride over the teeth or even to break. It has been proposed to space the sprocket teeth apart and to provide means i.e. openings in the sprocket for the discharge of any sawdust that may find its way between the teeth and be pressed inwardly toward the axis of the sprocket by the teeth of the saw chain.

The invention will be more fully and specifically described in connection with the accompanying drawings which illustrate the preferred embodiment of my invention.

Referring to the drawings.

FIG. 1 is a perspective view of the sprocket and drum assembly,

FIG. 2 is a section of the sprocket-drum assembly on the line 2—2 of FIG. 1,

FIG. 3 is a perspective view of the drum with the sprocket removed,

FIG. 4 is a perspective view of the sprocket,

FIG. 5 is a perspective view of the hub which serves to secure the sprocket and drum together, FIG. 6 is a plan view of the side of the sprocket which faces the drum in the sprocket-drum assembly, FIG. 7 is a plan view of the side of the sprocket which is normally positioned remote from the drum, and FIG. 8 is a plan view of the hub viewed from the end thereof which normally engages the drum.

The principal parts of the combination are the clutch drum 1, the sprocket 2 and the hub 3.

The clutch drum consists of the cylindrical flange 4 which is integral with the circular disc 5. The annular ring 6 extends from the face of the disc 5 and surrounds the central threaded opening 7. The ring 6 may be integral with or secured to the disc 5 as by brazing. The ring 6 is provided in its front face with a plurality of spaced apart grooves 8 which extend tangentially from the flange 9 to the periphery of the ring 6, the inner ends of said grooves 8 merging into each other to form an annular groove 10 surrounding the flange 9. The annular groove 10 and the connecting radially or tangentially extending grooves 8 serve to discharge sawdust from the sprocket 2 as will appear more clearly hereinafter but at this point I wish to note that the shape and arrangement of the grooves 8 and 10 are such that when rotated at high speed they produce an aspirating effect upon the sawdust.

The sprocket 2 consists of the outer flat ring 11 the inner edge of which is of such a size as to snugly fit around the shoulder 12 on the hub 3, and the outer edge of which, together with the outer edge of the inner ring 13 serve to support the saw chain. The inner ring 13 has the same outer diameter as the ring 11 but its inner diameter is larger than the inner diameter of ring 11 and also larger than the outer diameter of the hub 3 thus leaving an outlet for the discharge of sawdust from the space between the rings 11 and 13 into the annular groove 10 in the drum 1.

Between the rings 11 and 13 are wedge-shaped teeth 14. The point portions of the teeth are positioned at or near the peripheries of the rings 11 and 13. The bases of the teeth are bent or extend laterally at an angle of 90° to the point portions and extend into the space between inner edge of the ring 13 and the outer surface of the hub 3. The teeth 14 preferably are welded to the rings 11 and 13 but may be secured thereto in any other suitable way e.g. the teeth may be integral with one of the rings and spot welded to the other. It will be appreciated from the foregoing description that the sprocket 2 is a unitary structure consisting of the two rings 11 and 13 and the teeth 14. The inner edge of the ring 11 and the bases of the teeth 14 together provide a firm seating of the sprocket 2 on the hub 3. The ring 11 is provided with the notch 15 which is adapted to receive the projection 16 on the flange 17 of the hub 3 to secure the sprocket 2 and the hub 3 against relative rotation.

As appears from FIG. 5 the hub 3 consists of the flange 17, the shoulder 12 and the projection 16 referred to above and the outwardly threaded tubular portion 18 which is adapted to extend through the sprocket 2 and to be threaded into the threaded opening 7 in the ring 6 of the drum 1 and thus to secure the drum 1, the sprocket 2 and the hub 3 together.

The hub 3 may, as illustrated, be provided with an inner needle bearing assembly 19.

As appears from the foregoing disclosure sawdust which gets into the sprocket 2 between the teeth 14 and is pushed downwardly toward the surface of the hub 3, instead of packing in the spaces between the teeth, is aspirated through the spaces between the inner edge of the inner ring 13 of the sprocket and the bases of the teeth 14 into and through the annular groove 10 and the tangential grooves 8 into the atmosphere. The grooves 8 extend outwardly with respect to the hub 3 and rearwardly with respect to the normal direction of rotation of the drum.

I claim:

1. In a chain saw the combination of a clutch drum, a chain sprocket and a hub securing said drum and sprocket together, said sprocket comprising an inner ring bearing against said drum, an outer ring parallel to and spaced apart from said inner ring, spaced apart teeth secured between said inner and outer rings and sawdust outlet openings between the bore of said inner ring, the outer surface of said hub and the bases of said teeth, said clutch drum having in the face thereof adjacent to said sprocket grooves communicating with said sawdust outlet openings for discharging sawdust.

2. The combination as defined in claim 1 in which said grooves extend outwardly with respect to said hub and rearwardly with respect to the direction of rotation of said drum.

3. The combination as defined in claim 2 comprising an annular groove connecting the inner ends of said outwardly and rearwardly extending grooves.

4. A chain saw sprocket comprising spaced apart, parallel, flat, concentric circular rings having the same external diameters, circumferentially spaced apart teeth secured between said rings, one of said rings having a smaller bore than the other ring, said teeth extending radially inwardly to the smaller bore of said one ring and laterally within the larger bore of said other ring, the laterally turned inner ends of said spaced apart teeth serving as a seat for said other ring and the spaces bounded in part by the laterally turned inner ends of adjacent teeth and the bore of said other ring defining sawdust outlets.

5. A chain saw sprocket as defined in claim 4 in combination a cylindrical hub on which said sprocket is mounted, the external diameter of said hub being substantially the same as the bore of said one ring and being in contact with the inner ends of said teeth.

References Cited in the file of this patent

UNITED STATES PATENTS

| | | |
|---|---|---|
| 1,853,308 | Humphreys et al. | Apr. 12, 1932 |
| 2,387,064 | Forrest | Oct. 16, 1945 |
| 3,045,502 | Carlton | July 24, 1962 |